US 8,631,825 B2

(12) United States Patent
Lee et al.

(10) Patent No.: US 8,631,825 B2
(45) Date of Patent: Jan. 21, 2014

(54) PIEZO VALVE

(75) Inventors: Jin Woo Lee, Shihung-si (KR); Jong Dae Lim, Ansan-si (KR); Sang Hyoun Park, Shihung-si (KR)

(73) Assignee: Inzi Controls Co., Ltd., Kyunggi-do (KR)

( * ) Notice: Subject to any disclaimer, the term of this patent is extended or adjusted under 35 U.S.C. 154(b) by 470 days.

(21) Appl. No.: 12/976,684

(22) Filed: Dec. 22, 2010

(65) Prior Publication Data
US 2012/0161045 A1 Jun. 28, 2012

(51) Int. Cl.
*F16K 31/02* (2006.01)
(52) U.S. Cl.
USPC ................. 137/625.65; 137/625.44; 137/884; 251/129.06
(58) Field of Classification Search
USPC ............... 137/625.44, 625.65, 625.2, 596.17, 137/884, 82; 251/129.06
See application file for complete search history.

(56) References Cited

U.S. PATENT DOCUMENTS

| | | | |
|---|---|---|---|
| 2,883,995 A * | 4/1959 | Roy Astley Eugene et al. .............................. | 137/82 |
| 4,492,360 A * | 1/1985 | Lee et al. .................. | 251/129.06 |
| 4,629,926 A * | 12/1986 | Siegal ........................ | 251/129.01 |
| 4,771,204 A * | 9/1988 | Siegal ........................ | 251/129.01 |
| 5,343,894 A * | 9/1994 | Frisch et al. .............. | 137/625.65 |
| 6,024,340 A * | 2/2000 | Lazarus et al. ............ | 251/129.06 |
| 6,086,041 A * | 7/2000 | Gattuso et al. ............ | 251/129.06 |
| 6,173,744 B1 * | 1/2001 | Frisch et al. .............. | 137/625.65 |
| 6,367,767 B2 * | 4/2002 | Weinmann et al. ....... | 251/129.06 |
| 6,662,825 B2 * | 12/2003 | Frank et al. ..................... | 137/557 |
| 7,322,376 B2 * | 1/2008 | Frisch ........................ | 137/625.65 |
| 8,220,491 B2 * | 7/2012 | Schaible et al. .......... | 137/625.65 |
| 2005/0039807 A1 * | 2/2005 | Ford et al. ...................... | 137/884 |
| 2005/0199301 A1 | 9/2005 | Frisch | |

FOREIGN PATENT DOCUMENTS

KR   1020020039256   5/2002
KR   1020100043177   4/2010

* cited by examiner

*Primary Examiner* — Craig Schneider
*Assistant Examiner* — Craig J Price
(74) *Attorney, Agent, or Firm* — Rabin & Berdo, P.C.

(57) ABSTRACT

A piezo valve actuated by an electric voltage. The piezo valve includes a valve body having at least one port for introducing a fluid therethrough, an internal chamber communicating with the port, at least one valve seat for allowing the fluid to pass therethrough, and a circuit board for supplying an electric voltage; a valve unit opening or closing the valve seat of the valve body; a piezo plate bending-strained to either of opposite sides in response to the electric voltage, thus moving the valve unit; and a fastener fastening an end of the piezo plate to the valve body in a state in which a position of the piezo plate can be adjusted. Because the end of the piezo plate is fastened by the fastener, it is possible to fasten the piezo plate in a state in which the fastened position of the piezo plate can be adjusted.

16 Claims, 8 Drawing Sheets

PIEZO VALVE

BACKGROUND OF THE INVENTION

1. Field of the Invention

The present invention relates, in general, to piezo valves and, more particularly, to a piezo valve having a piezo plate actuated by an electric voltage.

Particularly, the present invention relates to a piezo valve in which a piezo plate is fastened by a method different from those used in conventional piezo valves, thus having an improved performance.

2. Description of the Related Art

Generally, a piezo valve opens or closes a flow path using a piezo plate bending-strained by an electric voltage. In recent years, these piezo valves are installed in vehicles and control the supply of engine fuel or control the supply of air for airbags embedded in the backs of passenger seats.

FIG. 1 is a sectional view illustrating the construction of a conventional piezo valve. In the conventional piezo valve, a piezo plate 7 is installed in a casing 2, as shown in FIG. 1, and is bending-strained at a first end thereof by an electric voltage applied thereto and opens or closes valve seats 4A and 5A of the casing 2. The piezo valve may be configured to open or close the two valve seats 4A and 5A of the casing 2, as shown in FIG. 1, or may be configured to open or close only one of the two valve seats 4A and 5A unlike the embodiment shown in the drawing.

In the piezo valve, the second end of the piezo plate 7 may be fastened to the casing 2 using a rubber plate 8, as shown in FIG. 1, or may be fastened to the casing 2 using epoxy mixed with a hardening agent.

However, because the piezo plate 7 of the piezo valve is fastened to the casing 2 at the second end thereof using the rubber plate 8 or the epoxy mixed with the hardening agent, it is very difficult to fasten the piezo plate 7 to the casing and it is impossible to adjust the fastened position of the piezo plate 7.

Further, because the first end of the piezo plate 7 directly opens or closes the valve seats 4A and 5A, the conventional piezo valve is problematic in that it has low sealing effect and low precision.

Therefore, in recent years, in an effort to increase both the sealing effects and the precision of the piezo valve, a piezo valve, in which a rubber valve disc is attached to the first end of the piezo plate 7 using a bonding agent, has been proposed. However, in the piezo valve, the rubber valve disc is directly attached to the first end of the piezo plate 7 using the bonding agent, so that the properties of the bending-strained end of the piezo plate 7 may be reduced or the end of the piezo plate 7 may be twisted, thereby reducing the valve performance of the piezo valve or reducing the precision of the piezo valve.

In recent years, a piezo valve having both a circuit board (not shown) and a pressure sensor (not shown) in the casing 2 has been marketed. The piezo valve is advantageous in that an electric voltage is applied to the piezo plate 7 through the circuit board and the pressure inside the casing 2 can be detected by the pressure sensor. However, the piezo valve is problematic in that a fluid passes both by the circuit board and by the pressure sensor, and that the fluid shortens the life spans of the circuit board and the pressure sensor and the piezo valve cannot realize precise control of the flow of a liquid fluid.

SUMMARY OF THE INVENTION

Accordingly, the present invention has been made keeping in mind the above problems occurring in the related art, and the present invention is intended to propose a piezo valve, in which a fastener for fastening a piezo plate is configured to fasten the piezo plate in a state in which the fastened position of the piezo plate is adjustable.

Further, the present invention is intended to propose a piezo valve, in which the fastener for fastening the piezo plate is an assembly type fastener that is assembled during a process of fastening the piezo plate.

Further, the present invention is intended to propose a piezo valve, which can distribute a force applied to an end of the piezo plate or can concentrate the force on one position.

Further, the present invention is intended to propose a piezo valve, in which two valve seats are formed at opposite positions such that they face each other and can be opened or closed at the same time or one of them can be selectively opened or closed.

Further, the present invention is intended to propose a piezo valve, in which a casing unit that incases the piezo plate therein is configured to have a divided structure, one of the valve seats is formed in one of the divided parts of the casing unit, and the circuit board is installed in a state in which the circuit board is separated from a space through which a fluid flows.

Further, the present invention is intended to propose a piezo valve, in which the pressure inside the space through which the fluid flows can be measured.

Further, the present invention is intended to propose a piezo valve, in which an opening/closing member for opening or closing the opposed valve seats is configured to be movable separately from the piezo plate such that the opening/closing member can close the opposed valve seats at the same time in a normal state and can selectively open the opposed valve seats in response to a bending strain of the piezo plate.

Further, the present invention is intended to propose a piezo valve, in which the piezo plate can open or close the opposed valve seats by moving the opening/closing member using a medium.

Further, the present invention is intended to propose a piezo valve, in which the medium for moving the opening/closing member has a simple structure and can move the opening/closing member in a state in which the medium is hooked by a part of the opening/closing member.

Further, the present invention is intended to propose a piezo valve, in which movement of the opening/closing member can be guided, so that the opening/closing member can be stably operated.

Particularly, the present invention is intended to propose a piezo valve, in which the casing unit that incases the piezo plate therein has a structure capable of receiving a plurality of piezo plates therein.

Further, the present invention is intended to propose a piezo valve, in which a member for moving the opening/closing member and a member for fastening the piezo plate are integrated into a single structure during an insert molding process.

In order to achieve the above object, according to one aspect of the present invention, there is provided a piezo valve actuated by an electric voltage, comprising: a valve body having at least one port through which a fluid is introduced, an internal chamber communicating with the port, at least one valve seat through which the fluid passes, and a circuit board for supplying the electric voltage; a valve unit opening or closing the valve seat of the valve body; a piezo plate bending-strained to either of opposite sides in response to the electric voltage supplied from the circuit board, thus moving the valve unit; and a fastener fastening an end of the piezo plate to the valve body in a state in which a position of the piezo plate can be adjustable.

The fastener may comprise: an insulating stick mounted to the end of the piezo plate and protecting the end of the piezo plate in an insulating state; a post mounted to the valve body and fitted through the insulating stick; a biasing member elastically biasing the insulating stick fitted through the post; and a stopper compressing the insulating stick at a location opposed to the biasing member and preventing the insulating stick from being removed from the post.

The stopper may comprise: a snap ring or a nut tightened to an end of the post.

The fastener may further comprise: a force distributing unit for distributing a compressing force, applied from the stopper to the insulating stick, toward an outside part of the insulating stick based on the post.

The force distributing unit may comprise: a stepped part formed in the insulating stick at a location around the post and receiving the compressing force of the stopper by an outside flat surface thereof.

The force distributing unit may further comprise: a sitting plate placed on the insulating stick in a way such that the sitting plate is seated on the outside flat surface of the stepped part, thus evenly distributing the compressing force of the stopper.

The fastener may further comprise: a force concentrating unit for concentrating a biasing force, applied from the biasing member to the insulating stick, toward an inside part of the insulating stick near the post.

The force concentrating unit may comprise: a boss protruding from the insulating stick at a location around the post and receiving the biasing force of the biasing member.

The force concentrating unit may further comprise: a sitting plate placed on the insulating stick in a way such that the sitting plate is seated on the boss, thus evenly concentrating the biasing force of the biasing member.

The valve seat of the valve body may comprise: a first valve seat and a second valve seat communicating with both the port and the internal chamber and located at opposed positions. Further, the valve unit moved by the piezo plate may comprise: a first plunger and a second plunger provided at opposed locations such that the first and second plungers respectively open or close the first valve seat and the second valve seat of the valve body having the circuit board; and a spring elastically biasing both the first plunger and the second plunger.

The valve body may comprise: a casing provided with the second valve seat, the port and the internal chamber therein, the casing being open at a part thereof thus exposing the internal chamber to an outside of the casing, with the circuit board installed in another part of the casing such that the circuit board is separated from the internal chamber; a first cover covering the open part of the casing and closing the internal chamber, and having the first valve seat linearly opposed to the second valve seat; and a second cover covering the casing at a location opposed to the first cover and protecting the circuit board.

The valve body may further comprise: a pressure sensor mounted on the circuit board and separated from the internal chamber, and connected at an end thereof to the internal chamber, thus sensing pressure inside the internal chamber.

The piezo valve may further comprise: a shift part combined with the piezo plate bending-strained in response to the electric voltage supplied from the circuit board of the valve body having the first valve seat, the second valve seat, the port and the internal chamber, the shift part moving the valve unit in response to a bending strain of the piezo plate fastened at the end thereof to the valve body by the fastener; and a connection part connecting the shift part to both the first and second plungers of the valve unit.

The shift part may comprise: a fork receiving the valve unit in a central portion thereof and connected to both the first and second plungers by the connection part.

The connection part may comprise: a hooking protrusion protruding from each of the first and second plungers and hooked by the fork.

The piezo valve may further comprise: a guide bar provided in the valve body and guiding movement of the first and second plungers.

The valve body may comprise: a plurality of valve bodies having respective first valve seats, respective second valve seats, respective ports and respective internal chambers, which are arranged in parallel to each other, with respective valve units, respective shift parts, respective connection parts, respective piezo plates and respective fasteners installed in the internal chambers.

The valve seat of the valve body may comprise: a first valve seat and a second valve seat communicating with both the port and the internal chamber and located at opposite positions, the valve unit moved by the piezo plate may comprises: a first plunger and a second plunger provided at opposed locations such that the first and second plungers respectively open or close the first valve seat and the second valve seat of the valve body having the circuit board; and a spring elastically biasing both the first plunger and the second plunger, the fastener may comprise: an insulating stick mounted to the end of the piezo plate and protecting the end of the piezo plate in an insulating state; a post mounted to the valve body and fitted through the insulating stick; a biasing member elastically biasing the insulating stick fitted through the post; and a stopper compressing the insulating stick at a location opposed to the biasing member and preventing the insulating stick from being removed from the post, and the stopper may comprise: a snap ring or a nut tightened to an end of the post, wherein the piezo valve may further comprise: a shift part combined with the piezo plate and moving the valve unit in response to a bending strain of the piezo plate; and a connection part connecting the shift part to both first plunger and the second plunger of the valve unit, wherein the piezo plate is insert-molded with the shift part and the insulating stick in opposite ends thereof, thus being integrated with both the shift part and the insulating stick into a single structure.

As described above, in the piezo valve of the present invention, the end of the piezo plate is fastened using the fastener, so that the fastened end of the piezo plate is prevented from being bending-strained, and particularly, the piezo plate can be fastened in a state in which the fastened position of the piezo plate can be adjusted using the fastener.

Further, because the insulating stick of the fastener mounted to the end of the piezo plate is tightened by the stopper in a state in which the insulating stick is elastically biased by the biasing member, it is possible to easily adjust the fastened position of the piezo plate using the biasing force of the biasing member.

Further, because the force distributing unit or the force concentrating unit can distribute or concentrate the compressing force and the biasing force, the fastened end of the piezo plate can be more securely fastened and thereby the other end (free end) of the piezo plate can be more reliably bending-strained.

Further, when the valve seat is embodied as the first and second valve seats opposed to and facing each other, it is possible to easily open or close the valve seats. Further, when the piezo valve is configured such that the first and second valve seats are opened or closed by the spring-biased first and second plungers, it is possible to open or close the valve seats at the same time and, further, it is possible to selectively open or close one of the first and second valve seats in response to a bending strain of the piezo plate.

Further, because the first valve seat is formed in the casing of the valve body and the circuit board is installed in the casing in a state in which the circuit board is separated from the internal chamber, the circuit board can be protected from the outside. Further, because the second valve seat is formed in the first cover, the valve body can be configured in the form of a divided structure and thereby the structure of the valve body can be variously changed.

Further, both the circuit board and the pressure sensor are installed in a way such that they are separated from the internal chamber of the valve body, so that it is possible to prevent the life spans of the circuit board and the pressure sensor by a fluid from being reduced. Further, because the pressure inside the internal chamber can be sensed by the pressure sensor, the flow rate of the fluid can be easily controlled in response to the sensed pressure.

Further, because the shift part moving the valve unit separately can move the first and second plungers using the connection part, it is possible to easily control the opening/closing operation of the first and second plungers.

Further, because a fork having a simple structure is used as the shift part, the shift part can be easily produced by a simple process. Further, because the hooking protrusion of the connection part can be integrally produced by the molding process that produces the first and second plungers, the connection part can be easily produced and can stably connect the fork to the first and second plungers.

Further, because the guide bar guides movement of the first and second plungers, the first and second plungers can be stably moved.

Further, when several internal chambers are formed in the casing, it is possible to install a plurality of piezo plate modules in one casing.

Further, when both the insulating stick and the shift part are formed with the piezo plate by an insert molding process, the piezo plate can be easily produced in the form of an integrated module.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, a piezo valve according to an embodiment of the present invention will be described with reference to the accompanying drawing.

Figure 1:
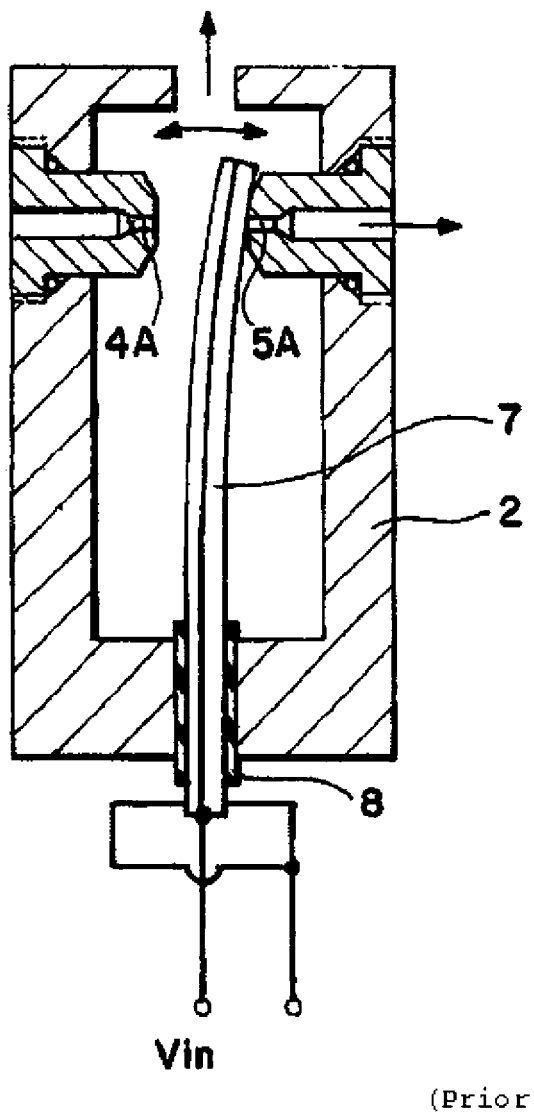
FIG. 1 is a sectional view illustrating the construction of a conventional piezo valve.
Figure 2:
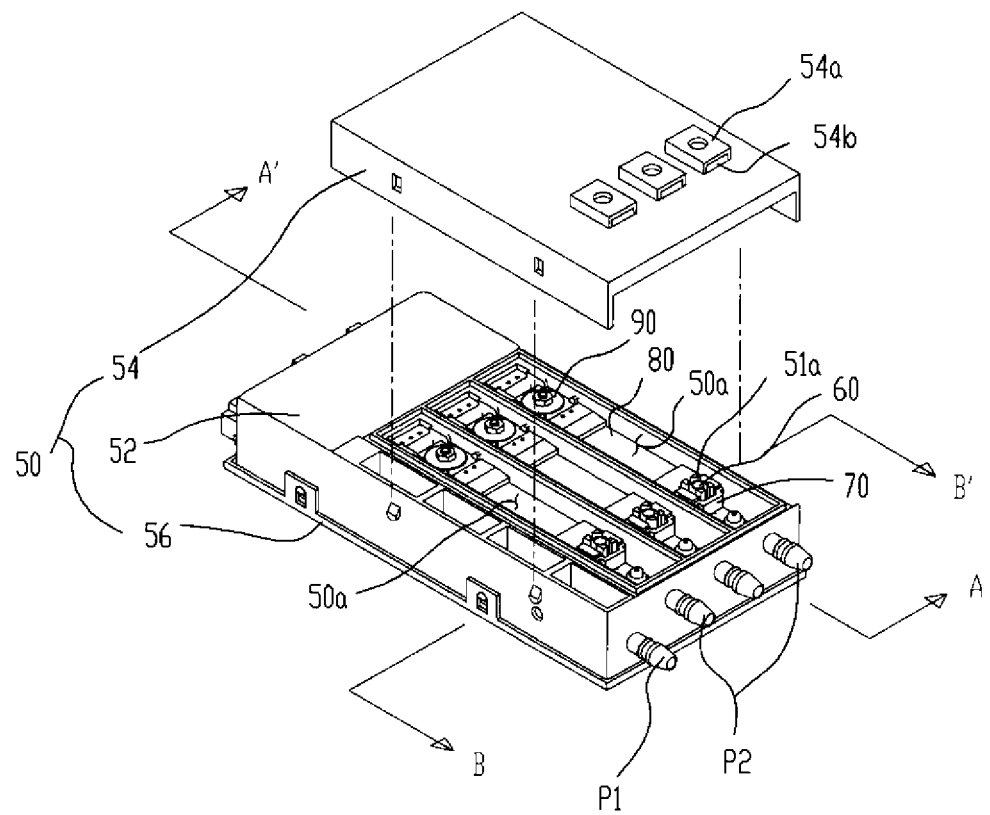
FIG. 2 is an exploded perspective view illustrating a piezo valve according to an embodiment of the present invention.

As shown in FIG. 2, the piezo valve according to an embodiment of the present invention includes a valve body 50 having separate parts, a valve unit 60, a piezo plate 80 and a fastener 90.

The valve body 50 may comprise a casing 52, a first cover 54 and a second cover 56, as shown in the drawing.

An internal chamber 50a is defined in the casing 52, as shown in the drawing. The casing 52 is open at an end thereof, as shown in the drawing, so that the internal chamber 50a is exposed to the atmosphere. The casing 52 may have a plurality of internal chambers 50a, as shown in the drawing, or may have a single internal chamber unlike the embodiment shown in the drawing. When the plurality of internal chambers 50a is defined in the casing, it is preferable that the chambers be defined in the form of a continuous parallel arrangement.

The casing 52 may be provided in a sidewall thereof with a pump port P1 for introducing compressed air into the casing 52 and a bidirectional port P2 for introducing or expelling air into or from the casing 52, as shown in the drawing.

Here, the above-mentioned pump port P1 is a path through which compressed air pumped by a pump (not shown) flows. Further, the above-mentioned bidirectional port P2 is a path for supplying compressed air, which has been introduced into the casing 52 through the pump port P1, to an airbag installed in a seat back (not shown) or for expelling the compressed air from the airbag to the internal chamber 50a of the casing 52. Of course, both the pump port P1 and the bidirectional port P2 communicate with the internal chamber 50a.

The first cover 54 is assembled with the open side of the casing 52, as shown in the drawing. The first cover 54 communicates with a first valve seat V1, which will be described later herein, and is provided with a pocket 54a, which has a sound absorbing material 54b, such as a sponge. The pocket 54a is formed at a location leveled with a valve unit 60, which is installed in the casing 52, as shown in the drawing.

The second cover 56 is assembled with the other side of the casing 52, which is the lower side of the casing 52, as shown in the drawing.

The valve unit 60 is installed in the internal chamber 50a of the casing 52 at a location near the bidirectional port P2, as shown in the drawing. The valve unit 60 is received in a shift part 70 and is surrounded by a vertical guide bar 51a, as shown in the drawing. It is preferable that the guide bar 51a comprise a plurality of guide bars and surround the valve unit 60, as shown in the drawing. The valve unit 60 is moved by the piezo plate 80.

The shift part 70 is a hollow part, as shown in the drawing, thus receiving the valve unit 60 in the hollow part. The piezo plate 80 is connected to the shift part 70 at a first end thereof and is connected to the fastener 90 at a second end thereof, as shown in the drawing.

Here, the above-mentioned shift part 70 is a part capable of moving the valve unit 60 in response to the bending strain of the piezo plate 80, as will be described later herein. In other words, the piezo plate 80 does not directly move the valve unit 60, but indirectly moves the valve unit 60 using the shift part 70. The shift part 70 is connected to the valve unit 60 by a connection part, which will be described later herein. Thus, the shift part 70 moves the valve unit 60 using the connection part.

Both the shift part 70 and the connection part may be omitted in accordance with the construction of the valve unit 60. For example, when the valve unit 60 is configured to be directly moved by the piezo plate 80, both the shift part 70 and the connection part can be omitted.

Figure 3:
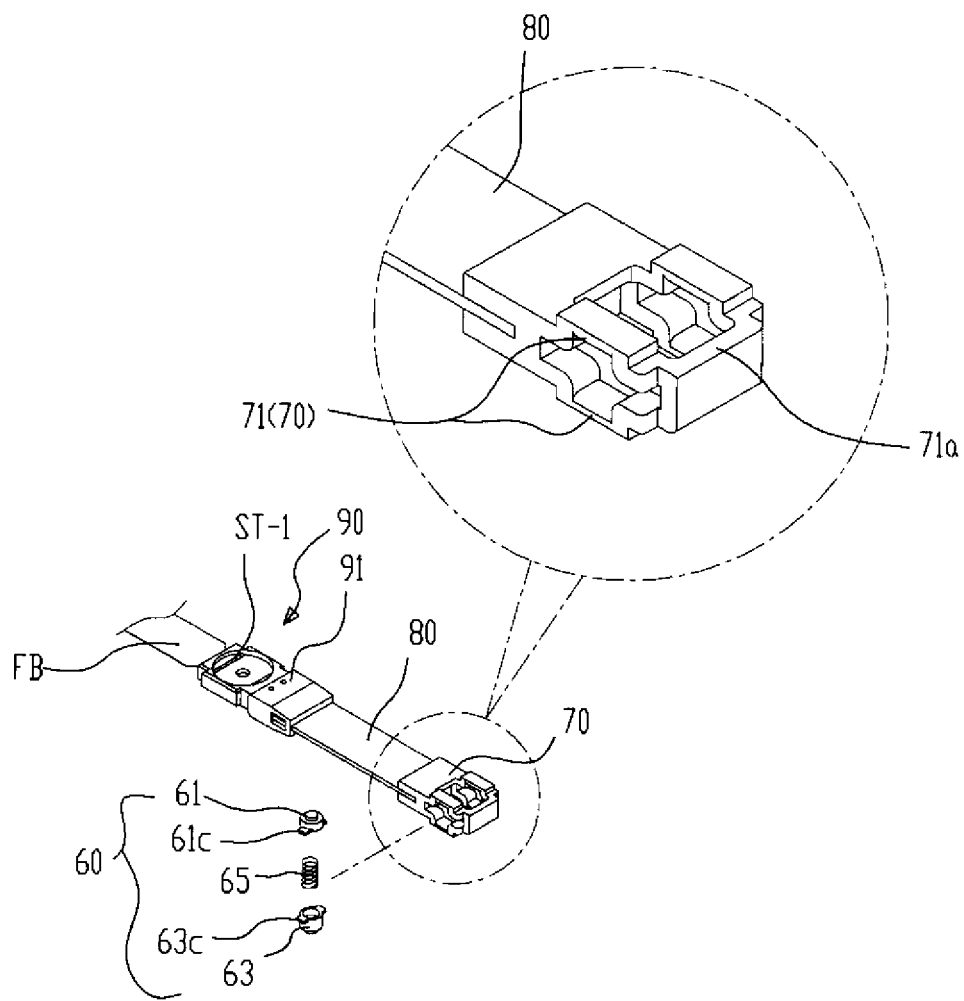
FIG. 3 is a perspective view illustrating a piezo plate, a shift part and a fastener shown in FIG. 2.

As shown in FIG. 3, the piezo plate 80 may be integrated with both the shift part 70 and an insulating stick 91 of the fastener 90 into a single structure by an insert molding process. However, the shift part 70 and the insulating stick 91 may be produced separately from the piezo plate 80 and may be mounted to opposite ends of the piezo plate 80 by a bolting process.

The shift part 70 comprises a fork 71, in which the front ends of tines are connected to each other by a connector 71a, as shown in the enlarged view. The fork 71 comprises two forks provided in the upper and lower parts of the shift part, respectively, as shown in the drawing. That is, the fork 71 is designed as a double fork. Because the ends of the tines of the fork 71 are connected to each other by the connector 71a, the strength of the fork is increased. However, when the fork 71 is made of a strong material, the connector 71a may be omitted.

The valve unit 60 may comprise a first plunger 61 and a second plunger 63, which are arranged to be opposed to each other, and a spring 65, which is interposed between the first and second plungers 61 and 63, as shown in the drawing. Alternatively, the valve unit 60 may comprise a rubber disc (not shown) attached to the first end of the piezo plate 80. The construction of the valve unit 60 is not limited to that shown in the drawings. The valve unit 60 is laterally inserted into the shift part 70 from a side, as shown in the drawing.

Here, the above-mentioned first and second plungers 61 and 63 are provided with respective connection parts for separably connecting the plungers 61 and 63 to the shift part 70. The connection parts may comprise hooking protrusions 61c and 63c, which are formed in the first and second plungers 61 and 63 in the form of flanges, as shown in the drawing. When the valve unit 60 is inserted into the shift part 70, the hooking protrusions 61c and 63c are hooked by the fork 71 of the shift part 70. Therefore, the hooking protrusions 61c and 63c can prevent the first and second plungers 61 and 63 from being undesirably removed from the fork 71 of the shift part 70 and can separably connect the first and second plungers 61 and 63 to the fork 71.

Further, the insulating stick 91 of the fastener 90 may be provided with a stepped part ST-1, as shown in the drawing. The stepped part ST-1 may comprise a stepped circular depression, as shown in the drawing. A flexible PCB FB, which is connected to the piezo plate 80, may be connected to the fastener 90.

Figure 4:
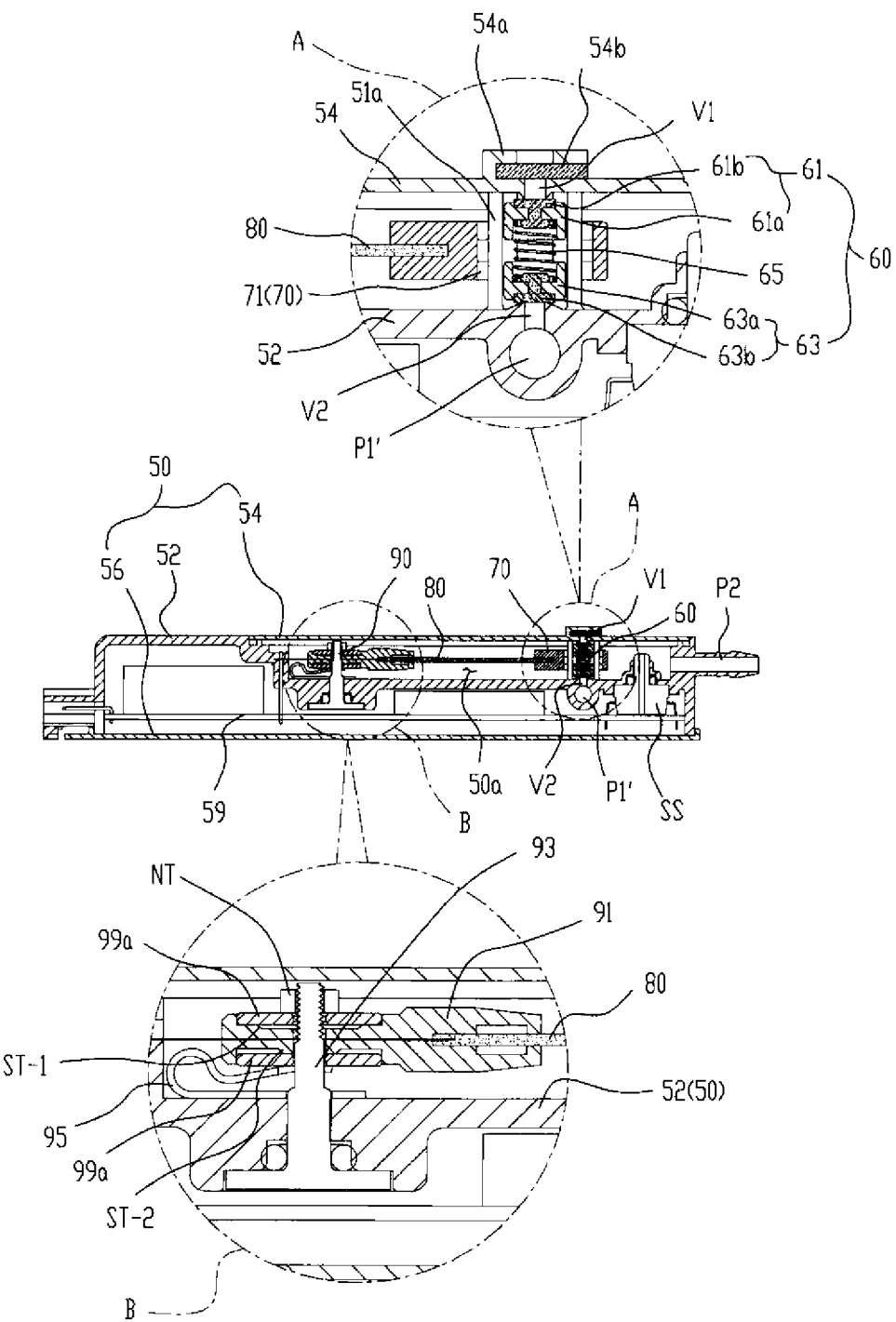
FIG. 4 is a sectional view taken along line A-A' of FIG. 2.

As shown in FIG. 4, a circuit board 59 is installed in a lower part of the casing 52 of the valve body 50 in a way such that the circuit board 59 can be separated from the internal chamber 50a of the casing 52. The circuit board 59 is protected from an external shock by the second cover 56, which is mounted to the lower end of the casing 52, as shown in the drawing. The valve body 50 may comprise the casing 52, the first cover 54 and the second cover 56, as shown in the drawing, or may comprise the casing 52 and the first cover 54 without having the second cover unlike the embodiment shown in the drawings. When the valve body 50 comprises the casing 52 and the first cover 54 without having the second cover, the circuit board 59 may be installed in the casing 52. Described in brief, the valve body 50 may be constructed unlike the construction shown in the drawings. That is, the construction of the valve body 50 is not limited to that shown in the drawings.

The casing 52 is provided with a port line P1' of the pump port P1 at a location near the bidirectional port P2, as shown in the drawing. The casing 52 is also provided with a second valve seat V2 at a predetermined location in the end thereof having the bidirectional port P2, as shown in the enlarged view of portion A. The second valve seat V2 communicates with the port line P1'.

The first cover 54 is mounted to the casing 52 and closes the internal chamber 50a, which is open upwards in the casing 52, as shown in the drawing. The first cover 54 has the first valve seat V1 having a hole shape, as shown in the enlarged view of portion A. The first valve seat V1 is opposed to the second valve seat V2 of the casing 52, as shown in the enlarged view of portion A, and communicates with both the port and the internal chamber 50a. In other words, the first valve seat V1 and the second valve seat V2 are aligned with each other along an axis.

In the first cover 54, the pocket 54a which is open at one end thereof communicates with the valve seat V1, as shown in the enlarged view of portion A. A sound absorbing material 54b, such as a sponge, is provided in the pocket 54a, as shown in the enlarged view.

The valve unit 60 is inserted in the fork 71 of the shift part 70 and closes both the first valve seat V1 and the second valve seat V2, as shown in the enlarged view of portion A. Here, both the first plunger 61 and the second plunger 63 are elastically biased by the spring 65, so that the valve unit 60 can close both the first valve seat V1 and the second valve seat V2.

Here, each of the above-mentioned first and second plungers 61 and 63 may comprise a plunger body 61a, 63a receiving the spring 65 therein and a rubber plug 61b, 63b mounted to an end of the plunger body 61a, 63a and opening or closing an associated one of the first and second valve seats V1, V2, as shown in the enlarged view. The rubber plug 61b, 63b may be fastened to the plunger body 61a, 63a by a fitting process, as shown in the enlarged view, or may be fastened to the plunger body 61a, 63a by a bonding process unlike the method shown in the drawing.

The piezo plate 80 is incased in the casing 52 of the valve body 50 in the form of a cantilever, as shown in the drawing. Of course, the cantilever type encasement of the piezo plate 80 in the casing is realized by fastening the second end of the piezo plate to the casing 52 using the fastener 90. Therefore, the first and second ends of the piezo plate 80 form a free end and a fixed end, respectively.

The fastener 90 may include an insulating stick 91, a post 93, a biasing member 95 and a stopper, as shown in the enlarged view of part B.

The insulating stick 91 is made of an insulating material, such as plastic, and is integrally combined with the second end of the piezo plate 80, as shown in the drawing, thus protecting the second end of the piezo plate 80 in an insulating state. The insulating stick 91 is fixed to the post 93, as will be described later herein, thus fastening the second end of the piezo plate 80 to the post 93.

The post 93 is fixed to the casing 52, as shown in the drawing. The post 93 may be a bolt, as shown in the drawing, or may be integrated with the casing 52 into a single body during a process of forming the casing. The insulating stick 91 is fitted over the post 93, as shown in the drawing.

The biasing member 95 may comprise a plate spring, as shown in the enlarged view, or may comprise a coil spring fitted over the post 93. The biasing member 95 elastically biases the second end (lower end) of the insulating stick 91, as shown in the drawing.

The stopper may comprise a nut NT, as shown in the enlarged view. The nut NT is tightened to the post 93 and compresses the insulating stick 91 at a location opposed to the biasing member 95. Therefore, when the insulating stick 91 is biased by the biasing member 95 at a side opposed to the nut NT, the stick 91 is not removed from the post 93.

The insulating stick 91 may be provided with a force distributing unit for distributing the compressing force of the stopper outwards. The force distributing unit may comprise the stepped part ST-1, which is formed in the insulating stick 91 at a location around the post 93, as shown in the enlarged view. The force distributing unit may further comprise a sitting plate 99a, which is placed on the insulating stick 91 and is seated on the outside flat surface of the stepped part ST-1, as shown in the enlarged view. The sitting plate 99a may comprise a washer, which is fitted over the post 93 and is seated on the outside flat surface of the stepped part ST-1.

The insulating stick 91 may be provided with a force concentrating unit for concentrating the biasing force of the biasing member 95 inwards. The force concentrating unit may comprise a boss ST-2, which protrudes from the insulating stick 91 at a location around the post 93, as shown in the enlarged view. It is preferable that the force concentrating unit comprise a sitting plate 99a, which is placed below the insulating stick 91 and abuts on the boss ST-2. The sitting plate 99a may comprise a washer, which is fitted over the post 93 and abuts with the boss ST-2.

Here, unlike the embodiment shown in the drawings, the stopper may comprise a head (not shown) formed on the end of the post 93 or may comprise a snap ring (not shown) forcibly fitted over the end of the post 93, or may comprise a countersunk nut (not shown) tightened to the end of the post 93. The head, the snap ring or the countersunk nut is combined with the end of the post 93, thus compressing the insulating stick 91 fitted over the post 93. Therefore, the insulating stick 91 is not removed from the post 93.

The above-mentioned head, the snap ring or the countersunk nut may be designed to have a 八-shaped cross-section, which is similar to the cross-section of a typical lamp shade. Thus, the lower surface of the head, the snap ring or the countersunk nut can be in linear contact with the surface of the insulating stick 91, so that the head, the snap ring or the countersunk nut can transfer the compressing force to the outer parts of the insulating stick 91. In other words, the head, the snap ring or the countersunk nut can distribute the compressing force outwards in the insulating stick 91. When the head, the snap ring or the countersunk nut is designed as described above, the force distributing unit may be omitted.

The above-mentioned structure of the head, the snap ring or the countersunk nut, and the cross-section thereof may be easily realized by those skilled in the art, so that further explanation thereof is thus deemed unnecessary.

The outer surfaces of the first and second plungers 61 and 63 of the valve unit 60 are guided by the guide bars 51a, as shown in the enlarged view of portion A. The guide bars 51a may be integrated with the casing 52 into a single structure, as shown in the enlarged view, or may be realized by fixing pins or bolts to the casing 52.

Further, a pressure sensor SS is mounted on the circuit board 59, as shown in the drawing. Because the pressure sensor SS is mounted on the circuit board 59, the pressure sensor SS is separated from the internal chamber 50a of the casing 52, as shown in the drawing. One end of the pressure sensor SS is inserted into the internal chamber 50a of the casing 52, as shown in the drawing.

Figure 5:
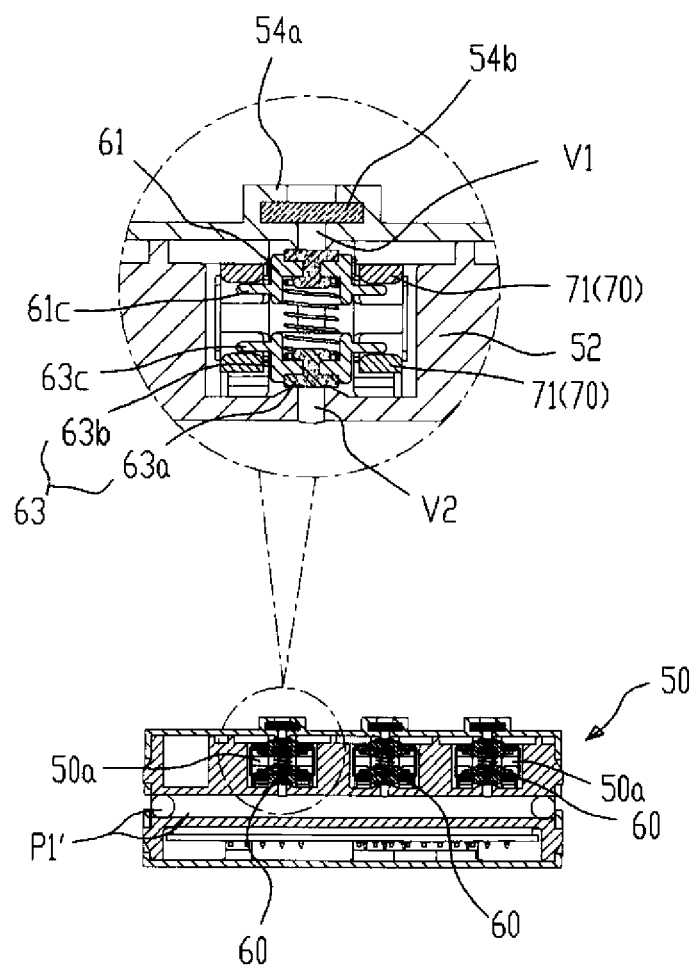
FIG. 5 is a sectional view taken along line B-B' of FIG. 2.

As shown in FIG. 5, several valve units 60 are installed in respective internal chambers 50a of the casing 52. The first and second plungers 61 and 63 of each valve unit 60 are biased by the spring 65 and are combined with the fork 71 of the shift part 70 by the hooking protrusions 61c and 63c, as shown in the enlarged view. In other words, the hooking protrusions 61c and 63c hook the first and second plungers 61 and 63 to the fork 71 of the shift part 70, so that the first and second plungers 61 and 63 can be detachably combined with the shift part 70.

The operation of the above-mentioned piezo valve according to the first embodiment of the present invention will be described hereinbelow with reference to FIG. 4 through FIG. 7.

As shown in the enlarged view of portion B of FIG. 4, the piezo plate 80 is fitted over and is fixed to the post 93 using the insulating stick 91. In the above state, because the insulating stick 91 is elastically biased by the biasing member 95, the fastened position of the piezo plate 80 can be adjusted. Described in detail, the second end of the piezo plate 80 can be mounted to the post 93 in a state in which the height of the piezo plate 80 can be adjusted. The fastened position of the piezo plate 80 can be changed in accordance with the flow rates both inside the port line P1' and inside the bidirectional port P.

During a normal state of the piezo valve, the piezo plate 80 mounted to the post 93 is in a straight state, as shown in the drawing. In the above state, the valve unit 60 closes the first and second valve seats V1 and V2 using the first and second plungers 61 and 63 elastically biased by the spring 65, as shown in the enlarged view of portion A, so that fluid cannot pass through the first or second valve seat V1, V2.

When the piezo plate 80 is in the straight state, the hooking protrusions 61c and 63c of the connection part are by the fork 71 of the shift part 70, as shown in FIG. 5. Therefore, the first and second plungers 61 and 63 do not move, as shown in the enlarged view, so that they continuously close the first and second valve seats V1 and V2, respectively.

Figure 6:
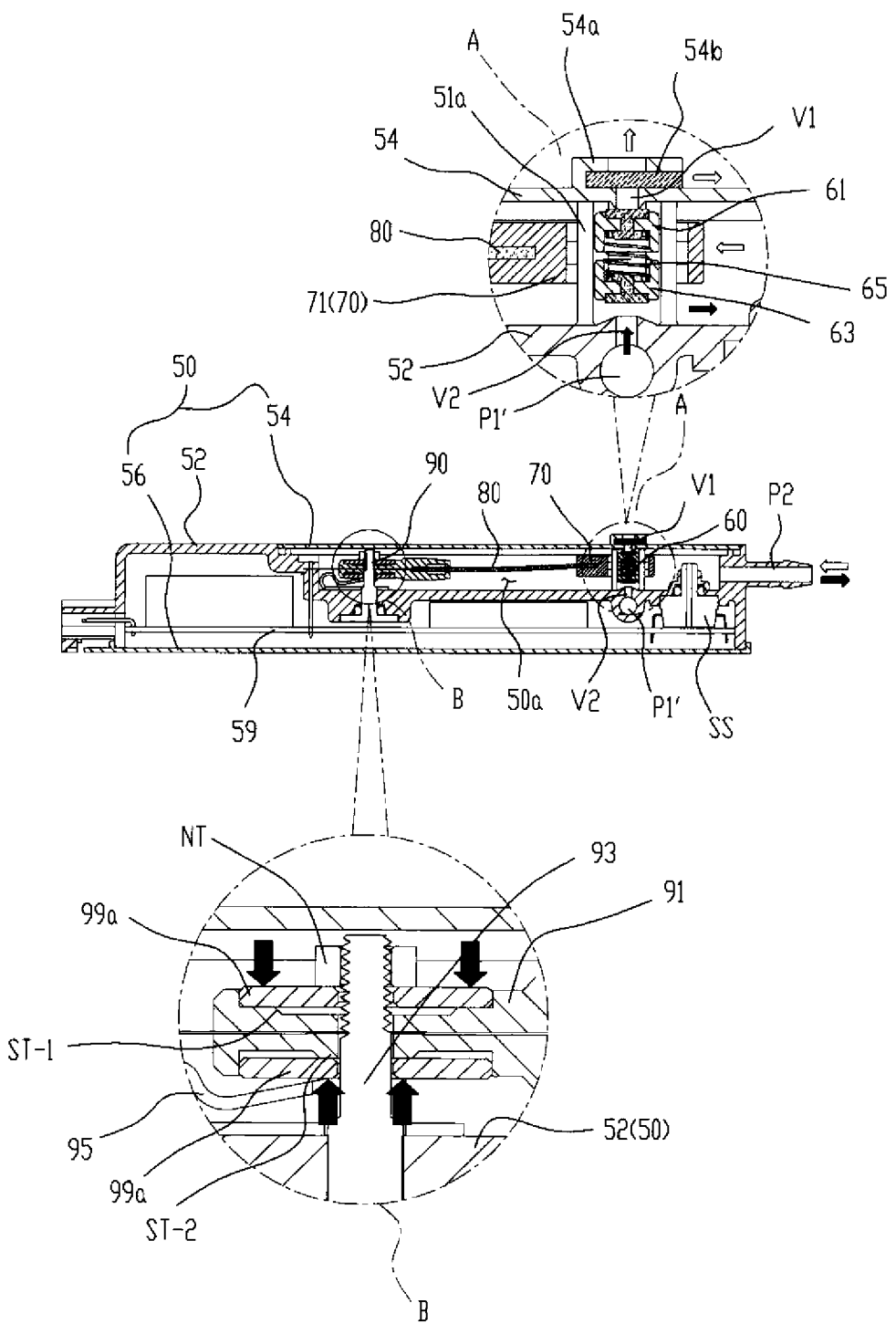
FIG. 6 is a sectional view taken along line A-A' of FIG. 2 and illustrating operation of the piezo plate.

However, when voltage is applied to the piezo plate 80 from the circuit board 59, the piezo plate 80 is bending-strained at the first end thereof, as shown in FIG. 6, thus moving the shift part 70. When the fork 71 of the shift part 70 in the above state is moved upwards, as shown in the enlarged view of portion A, the fork 71 lifts the second plunger 63 upwards and opens the second valve seat V2. Therefore, the compressed air, which has been pumped by a pump (not shown) and has been introduced into the casing 52 through the second valve seat V2, flows through the bidirectional port P2 and is charged in an airbag installed in a seat back (not shown).

The fastener 90 securely holds the second end of the piezo plate 80 and thereby prevents the second end of the piezo plate 80 from being bending-strained. In the above state, both the biasing member 95 and the nut NT of the stopper compress the opposite sides of the insulating stick 91 and thereby let the insulating stick 91 prevent the second of the piezo plate 80 from being moved.

When the stepped part ST-1 is provided in a first surface of the insulating stick 91, as shown in the enlarged view of portion B, the fastener 90 can apply the compressing force of the stopper to the outside flat surface of the stepped part ST-1. In other words, the compressing force of the stopper can be applied to the outside part of the insulating stick 91, as shown by the arrows in the drawing.

Further, when the boss ST-2 is provided in a second surface of the insulating stick 91, as shown in the enlarged view of portion B, the fastener 90 can apply the biasing force of the biasing member 95 to the boss ST-2. In other words, the biasing force of the biasing member 95 can be applied to the central part of the insulating stick 91, as shown by the arrows in the drawing.

Here, the compressing force of the stopper and the biasing force of the biasing member 95 may be directly applied to the stepped part ST-1 and the boss ST-2, respectively, or may be indirectly applied thereto by respective sitting plates 99a.

In the present invention, because the compressing force of the stopper is distributed to the outside part of the first surface (upper surface) of the insulating stick 91 and the biasing force of the biasing member is concentrated to the central part of the second surface (lower surface) of the insulating stick 91, as shown in the drawing, the insulating stick 91 can be securely fastened. Described in detail, the insulating stick 91 is compressed simultaneously at the outside part of the upper surface thereof and at the central part of the lower surface thereof, so that the insulating stick 91 strongly resists the bending moment. Therefore, the insulating stick 91 can be securely fastened and thereby prevents the second end of the piezo plate 80 from being moved.

When both the compressing force and the biasing force are concentrated on a central part of the upper or lower surface of the insulating stick 91, the part of the insulating stick 91, to which both the compressing force and the biasing force are concentrated, functions as a hinge. In the above state, the insulating stick 91 cannot desirably resist bending moment. Further, when both the compressing force and the biasing force are distributed to an outside part of the upper or lower surface of the insulating stick 91, the strength of the part of the insulating stick 91, to which both the compressing force and the biasing force are applied, is increased and thereby disturbs the bending strain of the piezo plate 80. However, in the embodiment of the present invention, the compressing force is distributed to the outside part of the upper surface of the insulating stick 91 and the biasing force is concentrated on the central part of the lower surface of the insulating stick 91, the insulating stick 91 does not function as a hinge but provides a desired strength to the piezo plate 80 such that the piezo plate 80 can be bending-strained.

The reason why the piezo valve is configured such that the compressing force and the biasing force are applied to the insulating stick 91 at different positions is that the piezo plate is a long member which is weak in bending moment. Particularly, because the first end of the piezo plate 80 is bending-strained, it is necessary to apply the compressing force and the biasing force to different positions. When the end of the piezo plate 80 is not bending-strained, it is not necessary to apply the compressing force and the biasing force to the different positions.

The pressure sensor SS senses pressure inside the internal chamber 50a of the casing 52 using the end thereof inserted into the internal chamber 50a. Therefore, the piezo valve according to the embodiment of the present invention can realize precise control of the flow rate.

Further, the first valve seat V1 expels the air, which has been discharged from an airbag (not shown) into the casing through the bidirectional port P2, to the atmosphere. In the above state, the sound absorbing material 54b absorbs pneumatic noises generated during the expelling of the air.

Figure 7:
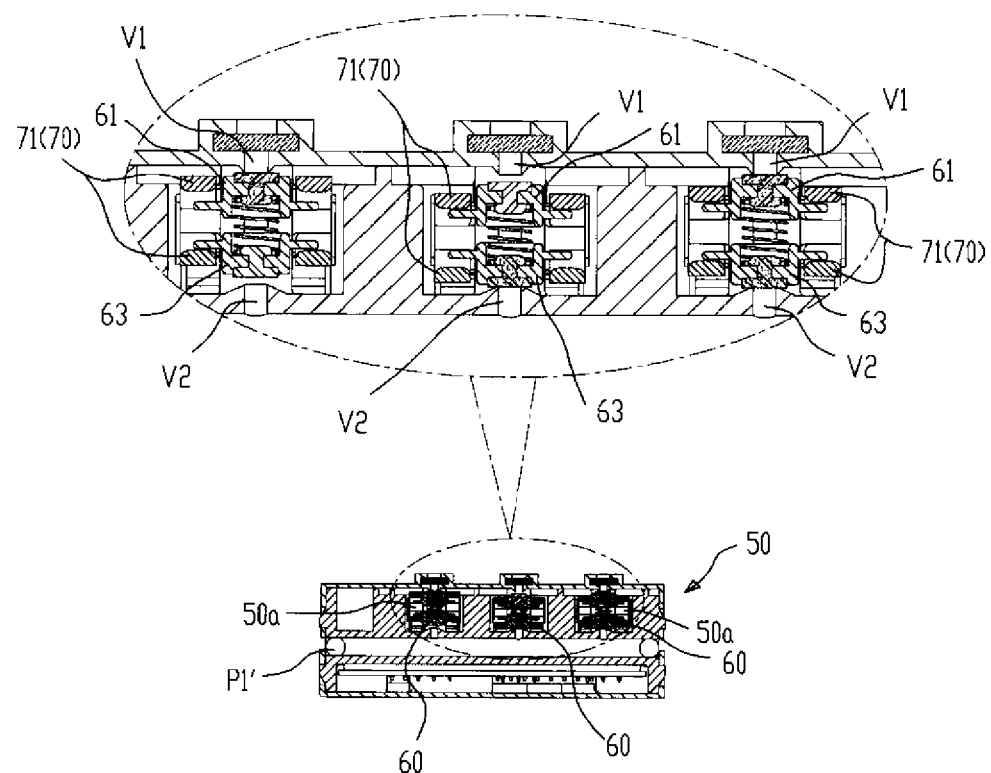
FIG. 7 is a sectional view taken along line B-B' of FIG. 2 and illustrating operation of the piezo plate.

As shown in FIG. 7, the fork 71 of the shift part 70 can be moved upwards or downwards by the bending strain of the piezo plate 80. When the fork 71 is moved upwards, the fork lifts the second plunger 63 by the hooking protrusion 63c of the second plunger 63, as shown in the left section of the enlarged view, thus opening the second valve seat V2. However, when the fork 71 is moved downwards, the fork 71 moves the first plunger 61 downwards by the hooking protrusion 61c of the first plunger 61, as shown in the central section of the enlarged view, thus opening the first valve seat V1.

As described above, in the piezo valve according to the embodiment of the present invention, the second end of the piezo plate 80 is fixed by the fastener 90, so that it is possible to fasten the piezo plate 80 while adjusting the fastened position of the piezo plate 80.

Further, because the insulating stick 91 of the fastener 90 mounted to the second end of the piezo plate 80 is fastened by the stopper in a state in which the stick 91 is elastically biased by the biasing member 95, the fastened position of the piezo plate 80 can be easily adjusted.

Further, because the force distributing unit and the force concentrating unit can distribute and concentrate the compressing force and the biasing force, the second end of the piezo plate 80 can be securely fastened, so that the first end of the piezo plate 80 can be more stably bending-strained.

In the present invention, the first valve seat V1 and the second valve seat V2 are formed at opposite locations, so that the valve seats V1 and V2 can be easily opened and closed. Further, when the valve seats V1 and V2 are designed to be opened or closed by the first plunger 61 and the second plunger 63, which are elastically biased by the spring 65, it is possible to open or close the valve seats V1 and V2 at the same time. Further, the present invention can selectively open or close one of the two valve seats V1 and V2 by the bending-strain of the piezo plate 80.

Further, because the first valve seat V1 is formed in the casing 52 of the valve body 50 and the circuit board 59 is installed in the casing 52 in a state in which the circuit board 59 is separated from the internal chamber 50a, the circuit board 59 can be protected from the outside. Further, because the second valve seat V2 is formed in the first cover 54, the valve body 50 can be designed in the form of a divided structure and thereby the structure of the valve body 50 can be variously changed.

Further, because both the circuit board 59 and the pressure sensor SS are installed in a state in which they are separated from the internal chamber 50a of the valve body 50, it is possible to prevent the life spans of both the circuit board 59 and the pressure sensor SS from being reduced by the fluid flowing in the internal chamber 50a. Further, the pressure inside the internal chamber 50a can be sensed by the pressure sensor SS, and thereby the flow rate of the fluid flowing in the internal chamber 50a can be controlled in response to the sensed pressure.

Further, the shift part, which moves the valve unit 60, separately moves the first and second plungers 61 and 63 using the connection part 60, so that it is possible to easily control the ON/OFF operation of the first and second plungers 61 and 63.

Further, the shift part comprises the fork 71 having a simple structure, so that the process that is used to produce the shift part can be an easy one. Further, because the hooking protrusions 61c and 63c of the connection part 60 can be integrally formed with the first and second plungers 61 and 63 when the plungers 61 and 63 are being formed by a process, it is possible to easily produce the connection part 60 and to stably connect the fork 71 to the first and second plungers 61 and 63.

Further, the guide bars 51a guide movement of the first and second plungers 61 and 63, so that the first and second plungers 61 and 63 can be stably moved and the precise control of the flow rate can be easily realized.

Further, when a plurality of internal chambers 50a are formed in one casing 52, a plurality of piezo plate modules can be installed in the single casing 52.

Further, when both the insulating stick 91 and the shift part 70 are formed in the piezo plate 80 by an insert molding process, it is possible to easily produce the piezo plate 80 in the form of an integrated module.

Figure 8:
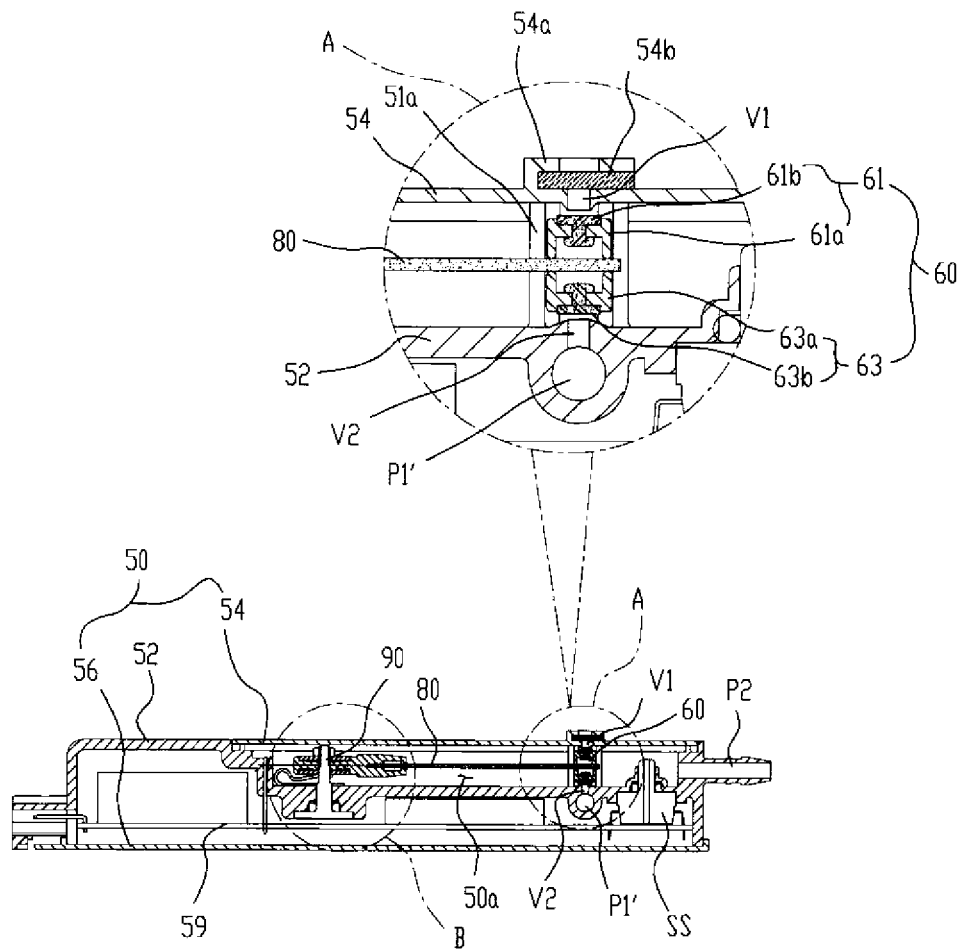
FIG. 8 is a cross-sectional view illustrating a piezo valve according to another embodiment of the present invention.

FIG. 8 is a cross-sectional view of a piezo valve according to a second embodiment of the present invention. The general shape of the piezo valve according to the second embodiment remains the same as that described for the first embodiment, but the valve unit 60 in the second embodiment is directly connected to the piezo plate 80 unlike the first embodiment.

As shown in FIG. 8, the piezo valve according to the second embodiment is a valve, in which both the shift part 70 and the hooking protrusions 61*c* and 63*c* of the connection part are omitted. In the piezo valve of the second embodiment, both the first plunger 61 and the second plunger 63 are directly mounted to the piezo plate 80, as shown in the enlarged view. The first plunger 61 and the second plunger 63 may be mounted to the piezo plate 80 using epoxy or a bending agent or by hot welding. Of course, in the second embodiment, the rubber plugs 61*b* and 63*b* may be directly mounted to the piezo plate 80 without using the plunger bodies 61*a* and 63*a*. In other words, the valve unit 60 may comprise only the rubber plugs 61*b* and 63*b*.

In the piezo valve according to the second embodiment, the valve unit 60 opens or closes one of the first and second valve seats V1 and V2 in response to a bending strain of the piezo plate 80. Described in brief, the piezo valve of the second embodiment is a valve, which is configured to open or close only one valve seat.

As described above, in the piezo valve of the second embodiment, the piezo plate 80 directly moves the valve unit 60 unlike the first embodiment. In other words, unlike the piezo valve according to the first embodiment, in which the valve unit 60 can be indirectly moved using both the shift part 70 and the connection part, the piezo valve of the second embodiment is configured to directly move the valve unit 60.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A piezo valve actuated by an electric voltage, comprising:
    a valve body having at least one port through which a fluid is introduced, an internal chamber communicating with the port, at least one valve seat through which the fluid passes, and a circuit board for supplying the electric voltage;
    a valve unit opening or closing the valve seat of the valve body;
    a piezo plate bending-strained to either of opposite sides in response to the electric voltage supplied from the circuit board, thus moving the valve unit; and
    a fastener fastening an end of the piezo plate to the valve body in a state in which a position of the piezo plate can be adjustable,
    wherein the fastener comprises:
    an insulating stick mounted to the end of the piezo plate and protecting the end of the piezo plate in an insulating state;
    a post mounted to the valve body and fitted through the insulating stick;
    a biasing member elastically biasing the insulating stick fitted through the post; and
    a stopper compressing the insulating stick at a location opposed to the biasing member and preventing the insulating stick from being removed from the post.

2. The piezo valve as set forth in claim 1, wherein the stopper comprises:
    a snap ring or a nut tightened to an end of the post.

3. The piezo valve as set forth in claim 1, further comprising:
    a force distributing unit for distributing a compressing force, applied from the stopper to the insulating stick, toward an outside part of the insulating stick based on the post.

4. The piezo valve as set forth in claim 3, wherein the force distributing unit comprises:
    a stepped part formed in the insulating stick at a location around the post and receiving the compressing force of the stopper by an outside flat surface thereof.

5. The piezo valve as set forth in claim 4, wherein the force distributing unit further comprises:
    a sitting plate placed on the insulating stick in a way such that the sitting plate is seated on the outside flat surface of the stepped part, thus evenly distributing the compressing force of the stopper.

6. The piezo valve as set forth in claim 1, further comprising:
    a force concentrating unit for concentrating a biasing force, applied from the biasing member to the insulating stick, toward an inside part of the insulating stick near the post.

7. The piezo valve as set forth in claim 6, wherein the force concentrating unit comprises:
    a boss protruding from the insulating stick at a location around the post and receiving the biasing force of the biasing member.

8. The piezo valve as set forth in claim 7, wherein the force concentrating unit further comprises:
    a sitting plate placed on the insulating stick in a way such that the sitting plate is seated on the boss, thus evenly concentrating the biasing force of the biasing member.

9. A piezo valve actuated by an electric voltage, comprising:
    a valve body having at least one port through which a fluid is introduced, an internal chamber communicating with the port, at least one valve seat through which the fluid passes, and a circuit board for supplying the electric voltage;
    a valve unit opening or closing the valve seat of the valve body;
    a piezo plate bending-strained to either of opposite sides in response to the electric voltage supplied from the circuit board, thus moving the valve unit; and
    a fastener fastening an end of the piezo plate to the valve body in a state in which a position of the piezo plate can be adjustable,
    wherein the valve seat of the valve body comprises:
    a first valve seat and a second valve seat communicating with both the port and the internal chamber and located at opposite positions,
    wherein the valve body comprises:
    a casing provided with the second valve seat, the port and the internal chamber therein, the casing being open at a part thereof thus exposing the internal chamber to an outside of the casing, with the circuit board installed in another part of the casing such that the circuit board is separated from the internal chamber;
    a first cover covering the open part of the casing and closing the internal chamber, and having the first valve seat linearly opposed to the second valve seat; and
    a second cover covering the casing at a location opposed to the first cover and protecting the circuit board.

10. The piezo valve as set forth in claim 9, further comprising:
    a pressure sensor mounted on the circuit board and separated from the internal chamber, and connected at an end thereof to the internal chamber, thus sensing pressure inside the internal chamber.

11. The piezo valve as set forth in claim 9, wherein the valve body comprises:

a plurality of valve bodies having respective first valve seats, respective second valve seats, respective ports and respective internal chambers, which are arranged in parallel to each other, with respective valve units, respective shift parts, respective connection parts, respective piezo plates and respective fasteners installed in the internal chambers.

12. A piezo valve actuated by an electric voltage, comprising:

a valve body having at least one port through which a fluid is introduced, an internal chamber communicating with the port, at least one valve seat through which the fluid passes, and a circuit board for supplying the electric voltage;

a valve unit opening or closing the valve seat of the valve body;

a piezo plate bending-strained to either of opposite sides in response to the electric voltage supplied from the circuit board, thus moving the valve unit; and a fastener fastening an end of the piezo plate to the valve body in a state in which a position of the piezo plate can be adjustable, wherein the valve seat of the valve body comprises:

a first valve seat and a second valve seat communicating with both the port and the internal chamber and located at opposite positions, and the valve unit moved by the piezo plate comprises:

a first plunger and a second plunger provided at opposed locations such that the first and second plungers respectively open or close the first valve seat and the second valve seat of the valve body having the circuit board; and a spring elastically biasing both the first plunger and the second plunger.

13. The piezo valve as set forth in claim 12, further comprising:

a shift part combined with the piezo plate bending-strained in response to the electric voltage supplied from the circuit board of the valve body having the first valve seat, the second valve seat, the port and the internal chamber, the shift part moving the valve unit in response to a bending strain of the piezo plate fastened at the end thereof to the valve body by the fastener; and a connection part connecting the shift part to both the first and second plungers of the valve unit.

14. The piezo valve as set forth in claim 13, wherein the shift part comprises:

a fork receiving the valve unit in a central portion thereof and connected to both the first and second plungers by the connection part.

15. The piezo valve as set forth in claim 14, wherein the connection part comprises:

a hooking protrusion protruding from each of the first and second plungers and hooked by the fork.

16. The piezo valve as set forth in claim 13, further comprising:

a guide bar provided in the valve body and guiding movement of the first and second plungers.

* * * * *